United States Patent [19]

Lacroix

[11] 4,249,751
[45] Feb. 10, 1981

[54] ANTITHEFT DEVICE FOR A MOPED

[75] Inventor: Bernard Lacroix, Montbeliard, France

[73] Assignee: Cycles Peugeot, Valentigney, France

[21] Appl. No.: 74,638

[22] Filed: Sep. 12, 1979

[30] Foreign Application Priority Data

Sep. 13, 1978 [FR] France .............................. 78 26335

[51] Int. Cl.³ ...................... B62H 5/06; B60R 11/06
[52] U.S. Cl. .................................. 280/289 L; 70/159;
 70/164; 70/233; 70/258; 180/205; 280/289 A
[58] Field of Search ....................... 180/205, 287, 289;
 280/289 L, 289 A, 289 R; 70/63, 164, 159, 258,
 233, 237, 240; 296/37.1, 37.8

[56] References Cited

U.S. PATENT DOCUMENTS

| 3,927,727 | 12/1975 | Hanagan | 280/289 R |
| 3,944,009 | 3/1976 | Katagiri | 280/289 R |
| 4,201,398 | 5/1980 | Meier | 280/289 L |

FOREIGN PATENT DOCUMENTS 521070  3/1955  Italy .................................... 280/289 A Primary Examiner—John J. Love
Assistant Examiner—Donn McGiehan
Attorney, Agent, or Firm—Sughrue, Rothwell, Mion, Zinn and Macpeak

[57] ABSTRACT

A steering mechanism lock which may be closed when the steering mechanism is turned to the full in a given position, a hood for covering the fuel tank and the pump and other accessories mounted on the sides of the tank, and a hook sliding in the steering mechanism tube and fitting in an opening of the upper part of the hood. Inside the tube, a pin cooperating with a sleeve precludes the raising of the hook out of the opening so long as the steering mechanism has not been turned to the full in the direction opposed to the direction for locking the steering mechanism.

7 Claims, 7 Drawing Figures

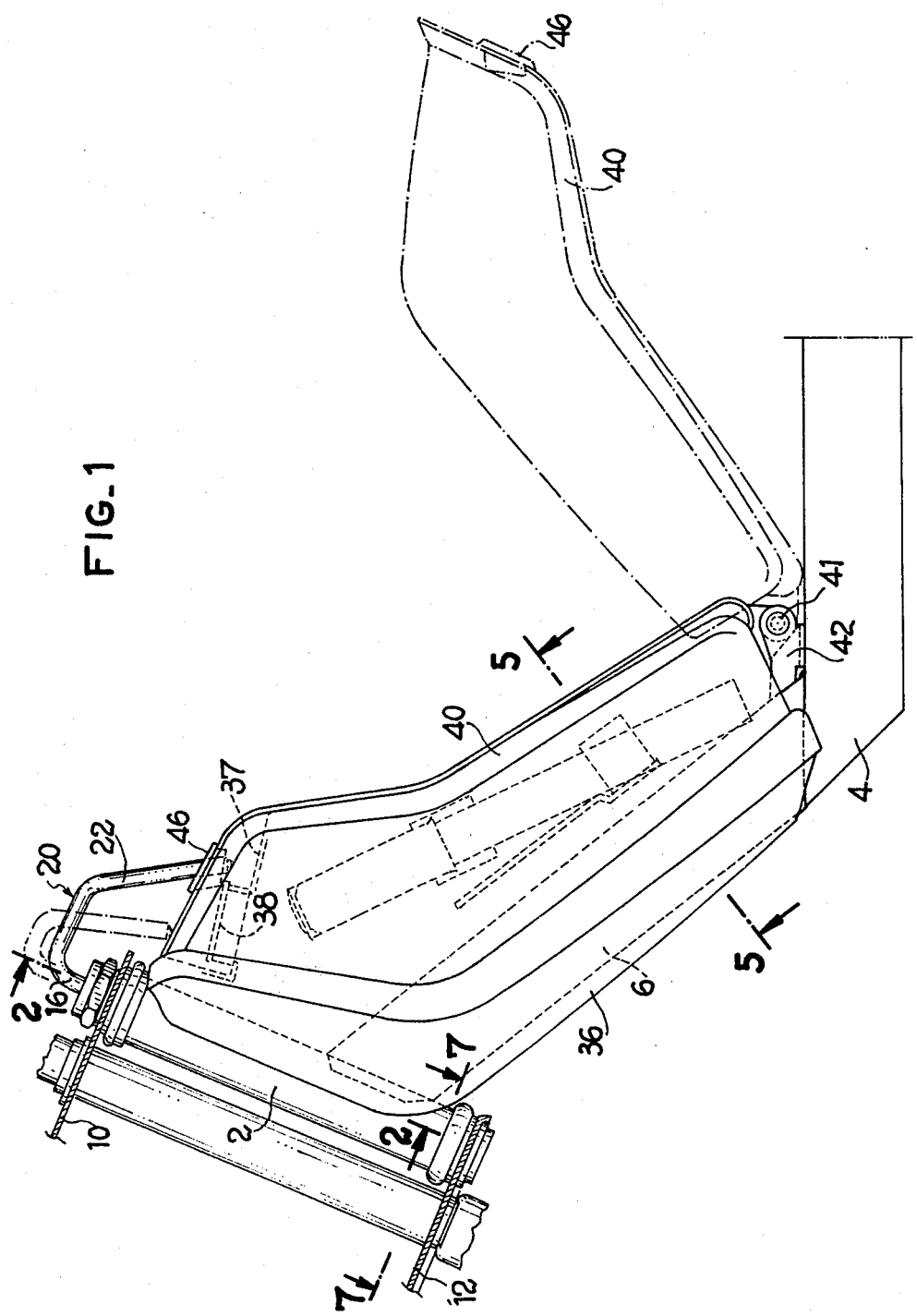

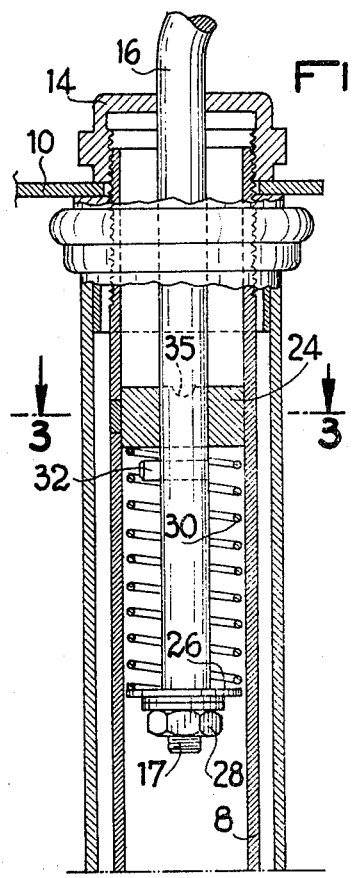
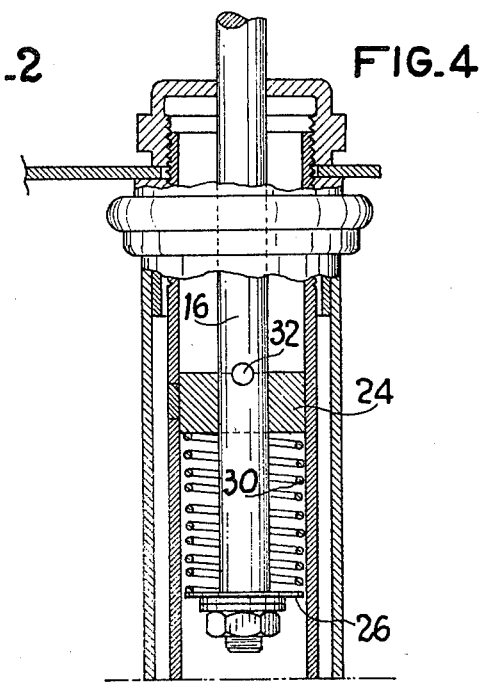
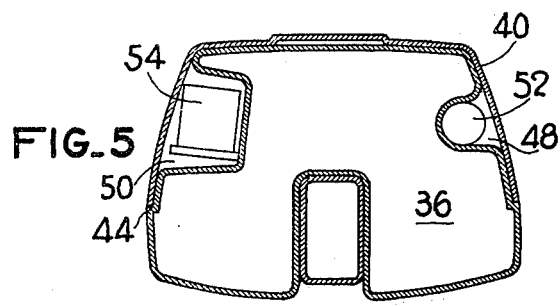
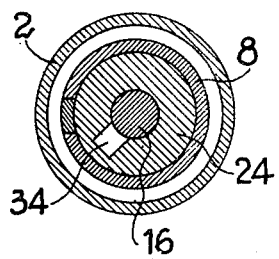
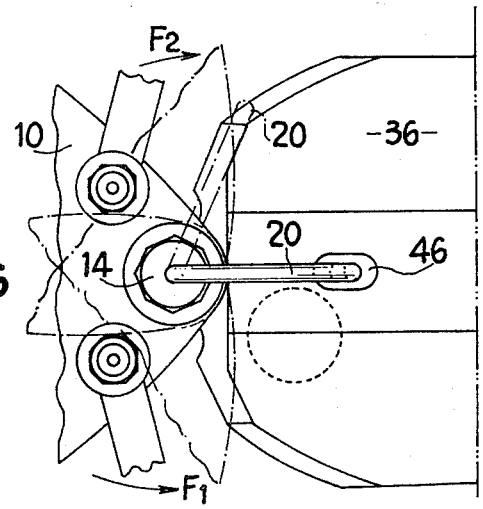

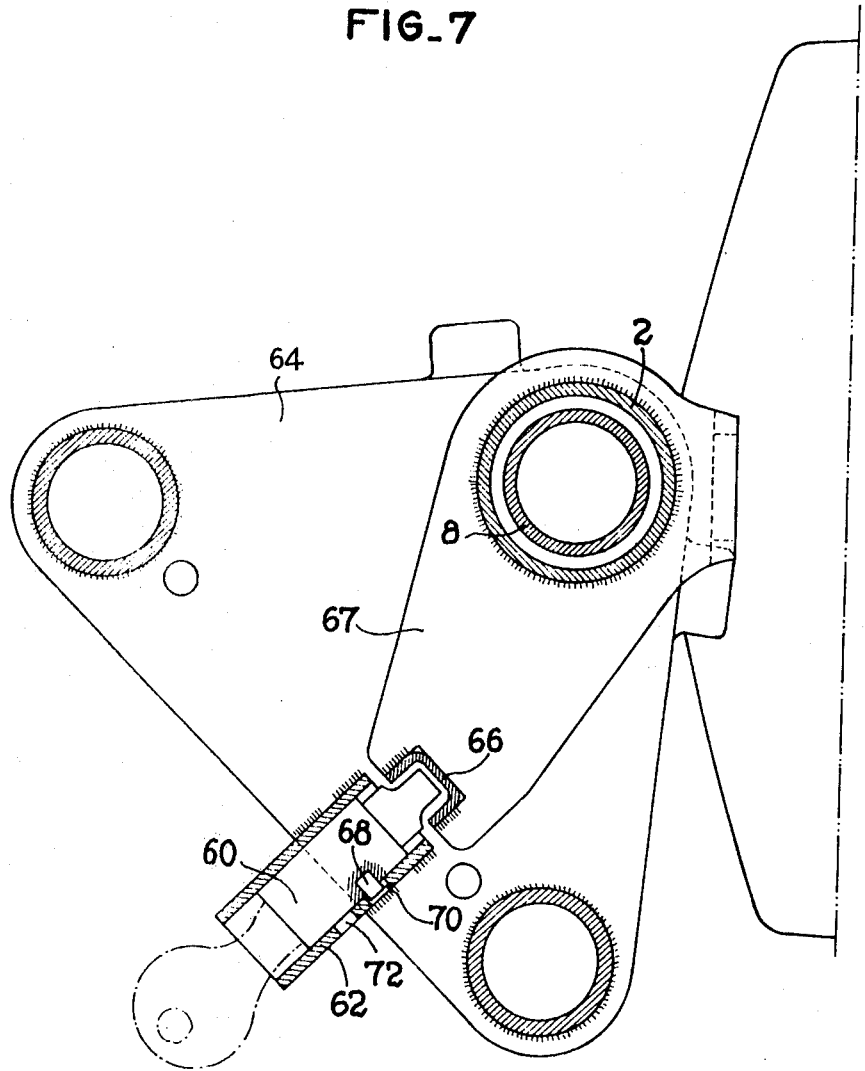

ANTITHEFT DEVICE FOR A MOPED

DESCRIPTION

Most mopeds sold at the present time are provided with an antitheft device for the steering mechanism which generally comprises a lock having a key which may be closed when the steering mechanism is turned to the end of its travel to the left or the right but requires a key to be unlocked so that the vehicle cannot be used by one who does not possess this key.

It has also been envisaged to provide mopeds with an antitheft device for the helmet constituted by a hook pivoted to the frame. This hook may be opened when the steering mechanism is in the straight-ahead position but is prevented from opening when the steering mechanism is not in the straight-ahead position. However, it has been found that the petrol tank and the pump or the tool box also need to be protected.

Consequently, the object of the present invention is to provide an antitheft device which simultaneously protects the various accessories of the moped.

According to the invention, there is provided an antitheft device which comprises a steering mechanism lock which may be closed when the steering mechanism is turned to the full in a given direction, and a hood for covering the petrol tank provided with an opening in its upper part, a hook forming, on one hand, a finger member for penetrating the opening of the hood, and, on the other hand, a rod which axially slides in the steering tube and, inside said tube, elastically yieldable means for biasing the rod to a lower position for blocking the finger member in the opening, and means for precluding the raising of the rod and the unlocking of the finger member of the hook so long as the hook and the pivot tube of the steering mechanism are not each in a given angular position corresponding to a turning of the steering mechanism to the full in the opposite direction of the turning of the steering mechanism for locking the steering mechanism.

In a preferred embodiment, the petrol tank comprises lateral recesses adapted to receive accessories, such as a tire inflating pump or a tool box, and the hood covers these components at the same time as the tank.

In this way, there is provided a complete locking of the accessories of the moped when the steering mechanism is locked, without the presence of complicated and numerous means, by an extremely simple operation.

Features and advantages of the invention will be apparent from the ensuing description of an embodiment of the invention which is given merely by way of example and shown in the accompanying drawings.

In the drawings:

FIG. 1 is a side elevational view, with a part cut away, of the front part of the frame of a moped;

FIG. 2 is an axial sectional view, to an enlarged scale, of the upper part of the steering tube of the moped of FIG. 1;

FIG. 3 is a sectional view taken on line 3—3 of FIG. 2;

FIG. 4 is a view similar to FIG. 2, the section being in a plane perpendicular to that of this FIG.;

FIG. 5 is a sectional view taken on line 5—5 of FIG. 2;

FIG. 6 is a partial top view of the moped of FIG. 1;

FIG. 7 is a sectional view, to an enlarged scale, and taken on line 7—7 of FIG. 2, corresponding to the steering locking position.

The antitheft device of the invention is more particularly adapted to be mounted on the front part of a moped whose frame comprises in the conventional manner a steering tube 2 connected to a lower tube 4 by an inclined tube 6. The steering tube 2 has axially extending therethrough a pivot tube 8 which is rigid with a head of a fork comprising in particular two plates 10 and 12 which are respectively upper and lower plates. In its upper part, the pivot tube 8 is externally screwthreaded and is extended beyond the steering tube 2 so as to extend through the plate 10 and be closed by a screwthreaded cap 14 (FIG. 2). Locking means (not shown) are interposed between the pivot tube 8 and the steering tube 2 and enables these two components to be locked with respect to each other when the pivot tube 8 has turned to a position corresponding to a fully turned position of the steering mechanism to one side of the moped. Only a voluntary intervention by means of a key permits the withdrawal of this lock and the releasing of the steering mechanism of the moped so as to enable it to move freely.

Locks of this type are known and employed commonly on mopeds. They usually comprise (FIG. 7) a bolt 60 which slides in a tubular guide 62 welded to a component of the fork, for example the lower plate 64, and a cavity 66 formed at the end of a member 67 attached to the frame, for example to the steering tube 2. When the steering mechanism is turned fully in a given direction, the cavity 66 is aligned with the bolt 60. This slidable bolt 60 can then either be engaged in the cavity connected to the frame and thereby locks the steering mechanism in this position, or be withdrawn from the cavity and thereby releases the steering mechanism.

Preferably, the slidable bolt 60 includes a pin 68 which is withdrawable by means of a key, and the guide tube has two cavities 70, 72 spaced apart longitudinally of the tube in which the pin can respectively enter when of the bolt is in the unlocked position and when it is in the locked position. It will be understood that the key is essential for withdrawing the pin and for passing from the locked position to the unlocked position of the bolt and consequently of the steering mechanism, and viceversa.

In other arrangements, the guide tube is connected to the steering tube and the cavity is formed in a member connected to a component part of the fork.

The fork of the moped may be of any appropriate form and consequently there is no need to describe it in more detail.

According to the invention, the upper part of the pivot tube 8 and the screwthreaded cap 14 which closes it have extending axially therethrough a rod 16 which is bent in its upper part successively laterally and then downwardly so as to form a hook 20 whose end portion constitutes an oblique finger member 22. Inside the pivot tube 8, the rod 16 extends through a sleeve 24 in which it slides freely and, moreover, supports in its lower part, a washer 26 which bears against a nut 28 screwed on a screwthreaded extension 17 of the rod 16. A spring 30, which bears, on one hand, against the washer 26 and, on the other hand, against the sleeve 24, tends to separate these two components and consequently bias the whole of the rod 16 and even the hook 20 downwardly inside the pivot tube 8.

The vertical upward displacement of the rod 16 is limited by the presence of a pin 32 which is fixed radially on this rod. The sleeve 24 however comprises a radial groove 34 having a size slightly greater than that of the pin 32 so as to permit the passage of this pin when the angular positions of the rod and tube correspond. Further, the upper surface of the sleeve 24 is provided with a semi-circular recess 35 which is capable of receiving the pin 32 when it has travelled through the groove 34 and pivoted laterally, the rod having passed from the lower position shown in FIG. 2 to the upper position shown in FIG. 4.

The moped further comprises a tank for petrol or other fuel 36 which is fitted on the inclined tube 6 of the frame (FIG. 1) and fixed to the steering tube 2. This tank 36 has in its upper part, a planar surface 37 having a filling orifice 38. A hood 40 is pivotally mounted on a pin 41 carried by a fork 42 which is rigid with the lower tube 4 and with the inclined tube 6 and disposed under the tank 36. The bottom of this hood and its two side walls have such dimensions and shape that they are capable of fitting the contour of the tank 36. However, preferably, the side walls of this tank each have a recess 44 forming a shoulder supporting the hood 40 when the latter is folded on top of the tank 36, that is to say in the position indicated in full lines in FIG. 1. In its upper part, the hood 40 has a pressed-out opening 46 for receiving the end of the finger member 22 of the hook 20 in the locking position. This locking corresponds to the lower position of the rod 16 in which the pin 32 is located below the sleeve 24 and is maintained in this position both by the action of the spring 30 and by the fact that it cannot pass through the sleeve 24. Consequently, the hook 20 cannot be raised out of the opening 46. The hood 40 is consequently locked to the tank 36 which precludes access to the filling orifice 38.

It is clear that a helmet may be passed over the hook 20 before it is locked to the hood 40 so that this helmet is also protected against theft.

In order to permit the unlocking of the hood 40 and free access to the filling orifice 38 and/or access to the opening of a helmet passed round the hook 20, the whole of the pivot tube 8 must be displaced to permit the alignment of the pin 32 of the rod 16 and the groove 34 of the sleeve 24. The relative positions of these components are chosen in such manner that this alignment can only occur when the hook 20 is in the locking position, that is to say when the finger member 22 is located in the opening 46 and the pivot tube 8 driving the fork unit is turned fully to one of the sides of the moped. In a preferred embodiment, this locking position corresponds to a fully-turned position of the steering mechanism of the moped in the direction opposed to the turning required for unlocking the steering mechanism lock. For example, if the turning required to obtain the locking or the unlocking of the steering mechanism is a fully-turned position toward the left side of the moped, that is to say in the direction of arrow f1 of FIG. 6, the turning required for unlocking the hook 20 will be turning toward the right, that is to say in the direction of arrow f2 of FIG. 6.

When the steering mechanism of the moped has thus been turned to the full toward the right, the hook 20 may be raised, the rod 16 effecting a vertical upward displacement inside the pivot tube 8 so that the pin 32 passes through the sleeve 24 via the groove 34 to a position above this sleeve. The finger member 22 is thus withdrawn from the opening 46. It can then be urged laterally so as to turn the rod 16 about its axis and bring the pin 32 in alignment with the recess 35 in which it may be seated. The rod 16 is then rendered rigid with the pivot tube 8 as concerns rotation and the hook 20 follows the movements of the steering mechanism of the moped but never constitutes a hindrance for the driver.

When it is once more necessary to lock the components of the moped, the hook 20 may be raised so as to disengage the pin 32 from the recess 35, and then a pivoting about the axis of the rod 16 brings this pin 32 in alignment with the groove 34 in which position the finger member 22 is located just above the opening 46. The spring 32 then automatically biases the pin 32 toward its lower position under the sleeve 24 which inserts the finger member 22 in the opening 46 and once more locks the tank 36 and of course a helmet or any other accessory previously passed around the hook 20. The whole of the fork driving the pivot tube 8 can then be displaced in the usual manner in the direction of arrow F1 so as to be brought to the fully turned steering position which permits the locking of the steering mechanism lock. It will be understood that when the steering mechanism is in this position, the combined actions of the spring 30 and the sleeve 24 preclude any raising of the hook 20 and any possibility of access to the helmet or tank 36.

In a preferred embodiment, this tank 36 comprises at least one and preferably two, lateral recesses, respectively 48 and 50, for example one containing an inflating pump 52 and the other a tool box 54 wich are thus protected, at the same time as the tank 36, by the hood 40.

With such an arrangement, there is made available an antitheft device which protects all of the important accessories of the moped at the same time by means of an extemely simple operation. All the accessories, such as the tank, the pump, the tools and even the helmet and other accessories are protected by the same device and locked together by the steering mechanism lock. Further, the pump and the tool box are protected from the weather by the presence of the hood covering the petrol tank. Access to these components remains however extremely simple and does not require a complex operation or dismounting.

Having now described my invention what I claim as new and desire to secure by Letters Patent is:

1. An antitheft device for a moped which comprises a frame, a petrol tank mounted on the frame, a steering mechanism mounted on the frame and capable of being turned to the full in either direction, and a lock for locking the steering mechanism when the steering mechanism has been turned to the full in a first direction, the steering mechanism including a steering tube and a pivot tube pivotable inside the steering tube, said device comprising a hood for covering the petrol tank and provided with an opening in an upper part of the hood, a hook forming a finger member for penetrating the opening of the hood and forming an axially slidable rod in the steering tube and, inside said tube, elastically yieldable means for biasing the rod to a lower position for locking the finger member in the opening and means for precluding the raising of the rod and the unlocking of the finger member of the hook so long as the hook and the pivot tube of the steering mechanism are not each in a given angular position corresponding to a turning of the steering mechanism to the full in a second direction opposed to the first direction.

2. A device as claimed in claim 1, comprising means for rendering the pivot tube of the steering mechanism rigid with the hook as concerns rotation in the unlocked position.

3. A device as claimed in claim 1, wherein the petrol tank comprises at least one lateral recess for receiving a pump, a tool box or other accessories and the side walls of the hood close said recess.

4. A device as claimed in claim 1, wherein the hood is pivotally mounted on the frame of the moped under the petrol tank.

5. A device as claimed in any one of the claims 1 to 4, wherein a sleeve is rigid with the pivot tube of the steering mechanism and the rod freely extends through the sleeve and is biased to the lower locking position by a coil spring which is mounted between its lower end and the sleeve.

6. A device as claimed in claim 5, wherein the rod carries a radial pin and the sleeve is provided with a radial groove allowing the passage of the pin when the hook is oriented toward the opening of the hood and the pivot tube is turned to the full in a given direction.

7. A device as claimed in claim 5, wherein the sleeve has in its upper part a radial recess for receiving and seating the pin of the rod, and which cooperates with said pin so as to render the rod rigid with the pivot tube as concerns rotation in said unlocked position.

* * * * *